3,015,593
METHODS AND COMPOSITION FOR PRODUCING A PHOSPHATE COATING ON ZINC METAL
John Phillip Jayne, Concord, Ohio
(1177 Johnny Cake Ridge, Painesville, Ohio)
No Drawing. Filed Oct. 4, 1960, Ser. No. 60,310
4 Claims. (Cl. 148—6.15)

This invention relates to a method and composition for producing a phosphate coating on zinc metal. More specifically, this invention concerns a method and material for producing on zinc, especially the zinc on galvanized steel, a calcium phosphate coating to increase paint adhesion.

For many years cationic phosphate have been applied to steel with the object of reducing corrosion. The phosphated steel has a clean rough surface which is receptive to organic materials of all description, these organic materials retard corrosion and also enhance the beauty of the steel. Likewise, calcium phosphate produced on zinc, and especially galvanized steel, will produce a surface which will be clean, rough, and chemically bonded to the zinc. The calcium phosphate on the zinc will anchor organic materials and especially paint to the surface of the zinc. A further advantage the calcium phosphate has, is that it is unreactive except to very strong acids, therefore, it will not react with organic compounds found in paints.

Zinc metal is considered a poor surface for lasting paint adhesion. The theory is generally accepted that zinc metal reacts with the vehicles in the paint to produce organic zinc soaps. The zinc soaps are formed between the paint and the zinc surface so that when thermo contraction or expansion occurs or moisture penetrates the paint, the adhesion between the paint and zinc is no longer there and the paint flakes off. Calcium phosphate on a zinc surface is very advantageous in stopping paint flaking off because the inactive calcium phosphate separates the paint from the active zinc metal. The paint will adhere to the calcium phosphate instead of the zinc metal.

It is accordingly an object of this invention to describe a method and composition formula which when applied to zinc metal will form a calcium phosphate with certain advantages in reducing the corrosion of galvanized steel and create better paint adhesion to zinc metal. It should be understood that this process follows the "Art of Phosphating."

The zinc metal articles need not necessarily be cleaned before introduction into the calcium phosphating solution. However, if the zinc metal surfaces are covered with acidified water insoluble compounds it is necessary to remove said compounds by the best method possible so as to allow zinc metal to show as the reacting surface in the calcium phosphate solution.

The calcium phosphating solution is acidic. It can be applied to zinc metal by dip or spray. The calcium phosphate solution is generally applied hot. The temperature at which the solution will produce the fastest coating is dependent upon the concentration of the active ingredients. The general time in which calcium phosphate will form on zinc metal is inversely proportional to the concentration of active ingredients in the phosphating solution and inversely proportional to the temperature of the solution. Generally, it is best to work with a hot calcium phosphating solution and the corresponding active ingredient concentration so as to obtain faster coating deposition while the hot solution contributes greater dissolution to objectional films covering the zinc metal surface.

The active ingredients in this invention are the calcium ion, the ortho phosphate ion, and an oxidizing ion. The oxidizing ion is the accelerator, that is, it affects the rate at which the phosphate coating will form on the zinc metal. Accelerators are nitrate ions, nitrite ions, chlorate ions, etc.

Although the relative proportions of the ingredients of the phosphate coating solution may vary within wide limits, such proportion in the concentrate are preferably as follows:

| | Percent by weight |
|---|---|
| Calcium nitrate | 20.0 to 45.0 |
| Alkali metal dihydrogen phosphate | 3.0 to 10.0 |
| Phosphoric acid (75%) | 4.0 to 9.0 |
| Alkali metal nitrate | 0.1 to 10.0 |
| Water to make 100.0. | |

In referring to "alkali metal" dihydrogen phosphate, "alkali metal" nitrate, "alkali metal" nitrite, etc. it is of course intended that sodium, potassium, and ammonia compounds of these radicals be included, together with lithium and the other well known alkali metals.

In accordance with a preferred embodiment of this invention a concentrated solution was prepared consisting of:

*Example 1*

| | Percent of weight |
|---|---|
| Calcium nitrate | 40.0 |
| Mono sodium dihydrogen phosphate | 10.0 |
| Phosphoric acid (75%) | 9.0 |
| Sodium nitrate | 10.0 |
| Water | 31.0 |

The working solution was prepared by adding the above concentrate to water in the volume ratio of 10 parts concentrate to 90 parts water. Sodium hydroxide solution was added to the solution until the free acid points were two or the ratio of free to total acid was eight or more. Points of acid referred to above means the number of milliliters of .1 normal sodium hydroxide used to titrate a five milliliter sample of the phosphating solution. The free acid is the number of milliliters of the .1 normal sodium hyroxide used to cause methyl orange indicator to turn from red to yellow. The total acid points referred to the number of milliliters of .1 normal sodium hydroxide to change phenolphthalein from clear to red. The points system of controlling a phosphating solution is common practice in the art of phosphating. The calcium phosphating solution operates best in the pH range of 3.9 to 4.2.

The pH of the calcium phosphating solution will rise slightly upon working the solution with zinc metal. The concentrate is adjusted to compensate for the gradual rise in pH.

The phosphating solution is adjusted in concentration by adding concentrate when the total acid is reduced by one or two points. Small frequent additions of concentrate is better control procedure rather than large infrequent additions.

The calcium phosphate forms on the immersed zinc surface in from five to fifteen minutes in a hot dip solution. The calcium phosphate coating forms on the zinc metal considerably faster if the solution is applied by hot spray method.

Other specific examples of working concentrates in accordance with this invention are as follows:

*Example 2*

| | Percent by weight |
|---|---|
| Calcium nitrate | 40.0 |
| Mono sodium dihydrogen phosphate | 10.0 |
| Phosphoric acid (75%) | 9.0 |
| Sodium nitrite | 0.05 |
| Water | 40.95 |

*Example 3*

| | Percent by weight |
|---|---|
| Calcium nitrate | 50.0 |
| Mono sodium dihydrogen phosphate | 10.0 |
| Phosphoric acid (75%) | 5.0 |
| Water | 35.0 |

Although specific forms of the invention have been described herein for the sake of clarity, it will be appreciated that equivalents may be substituted for the components and method steps specifically described, and that certain features of the invention may be used independently of other features, all within the spirit and scope of the invention as defined in the appended claims.

Having thus described my invention, I claim:

1. In a composition for coating zinc metal consisting essentially of:

| | Percent by weight |
|---|---|
| Calcium nitrate | 5.0 |
| Mono sodium dihydrogen phosphate | 1.0 |
| Phosphoric acid | 0.2 |
| Sodium nitrate | 1.0 |
| Water | 92.8 |

2. In a composition for coating zinc metal consisting essentially of:

| | Percent by weight |
|---|---|
| Calcium nitrate | 5.0 |
| Mono sodium dihydrogen phosphate | 1.0 |
| Phosphoric acid (75%) | 0.2 |
| Sodium nitrite | 0.1 |
| Water | 93.7 |

3. In a concentrate which when diluted with nine parts water to one part concentrate by volume and the solution heated from 50° C. to 105° C. will produce an adherent uniform calcium phosphate coating on zinc metal surfaces, the concentrate consisting essentially of calcium nitrate 20 to 45 percent by weight, alkali metal dihydrogen phosphate 3 to 10 percent by weight, (75%) phosphoric acid 4 to 9 percent by weight, an accelerator such as an alkali metal nitrate .1 to 10 percent by weight, and enough water to make 100 percent by weight.

4. In an aqueous solution which will produce a uniformly bonded calcium phosphate compound on zinc metal surfaces, the aqueous solution being in the temperature range of 50° C. to 105° C., the solution consisting essentially of calcium nitrate 2.5 to 5 percent by weight, alkali metal dihydrogen phosphate .5 to 1.5 percent by weight, (75%) phosphate acid .001 to .05 percent by weight, an accelerator such as an alkali metal nitrate from .2 to 10 percent by weight, and enough water to make 100 percent by weight.

References Cited in the file of this patent

UNITED STATES PATENTS

| 2,528,787 | Roland | Nov. 7, 1950 |
| 2,859,145 | Somers et al. | Nov. 4, 1958 |

FOREIGN PATENTS

| 211,592 | Australia | Nov. 20, 1957 |